United States Patent Office 3,446,776
Patented May 27, 1969

3,446,776
PROCESS FOR PRODUCING HIGH MOLECULAR WEIGHT POLYMER OF FORMALDEHYDE
Kenichi Fukui and Tsutomu Kagiya, Kyoto, Hisao Yokota, Kobe, Yahiko Toriuchi, Toyonaka-shi, and Shunji Matsumi, Suita-shi, Japan, assignors to Sumitomo Chemical Company, Ltd., and Sumitomo Atomic Energy Industries Ltd., Osaka, Japan
No Drawing. Filed Nov. 8, 1965, Ser. No. 506,834
Claims priority, application Japan, Nov. 27, 1964, 39/66,750
Int. Cl. C08g 1/02, 1/20
U.S. Cl. 260—67    5 Claims

ABSTRACT OF THE DISCLOSURE

Crude formaldehyde prepared by thermal decomposition of alpha-polyoxymethylene without preliminary purification is polymerized in liquid phase in the presence of either an anionic or a cationic catalyst to produce a high molecular weight polymer, in a solvent system containing carbon dioxide as a main component, in a closed system. The unreacted monomer and the carbon dioxide are separated from the resulting polymer merely by reducing the pressure in the reaction vessel. Optionally, an organic solvent having a boiling point of up to 40° C. may be used as an additional component of the solvent system.

---

The present invention relates to a novel process for polymerizing formaldehyde characterized by reacting formaldehyde in the presence of an ionic catalyst in a solvent system containing carbon dioxide as a main component.

It has been hitherto long known that formaldehyde may polymerize to form a solid polymer, as described in H. Staudinger, "Die Hochmolekularen Organischen Verbindungen," Springer-Verlag, Berlin, 1960 and J. F. Walker, "Formaldehyde," 2nd Ed., Reinhold Pub. Co., New York, 1953. However, the resultant polymers were not suitable for the application as a plastic material because they were of a relatively low molecular weight, a poor thermal stability and an inferior toughness.

Since R. N. MacDonald disclosed a process for preparing a useful formaldehyde polymer from substantially anhydrous formaldehyde in U.S. Patent No. 2,768,994, there have been many published processes for preparing a useful high molecular weight polymer of formaldehyde with a catalyst of amines, organic metal compounds or the like or irradiation by an ionizing radiation such as γ-ray or the like. However, in each of these known processes, it is required to purify the starting monomer by means of highly removing a very small quantity of any water contained in the material, that is, to employ substantially anhydrous formaldehyde as the starting material.

The polymerization is usually carried out in an organic solvent or dispersion medium in order to facilitate the removal of the polymerization heat, although a bulk polymerization without any solvent may be carried out in a few cases. Therefore, the use of a highly purified solvent or dispersion medium is required in the most cases, and it is also necessary to separate and remove the organic solvent or dispersion medium used in order to isolate the resultant polymer.

We have made an intensive study of the polymerizability of formaldehyde and have disclosed that the undesirable spontaneous polymerization of formaldehyde may be inhibited by adding an anhydride of an organic or inorganic acid to the polymerization system (Belgian Patent No. 639,513) and that a radiation-induced polymerization, which had been heretofore carried out at a low temperature below −50° C., may be carried out at an advantageous temperature in the neighbourhood of room temperature (Belgian Patent No. 639,332).

We have further studied the polymerization of formaldehyde in the presence of carbon dioxide, and have now found that a polymer free of an undesirable low molecular weight polymer, which may be used as a plastic, may be readily prepared by polymerizing formaldehyde with an ionic catalyst in a solvent system containing carbon dioxide as a main component.

We have found that carbon dioxide and formaldehyde are perfectly soluble in each other and a solution of any ratio may be prepared by adding carbon dioxide under pressure to cooled and liquefied formaldehyde. Thus, a uniform solution having any concentration may also be obtained by adding Dry Ice as carbon dioxide to liquid formaldehyde or by compressing and liquefying a gaseous mixture of formaldehyde and carbon dioxide in any ratio.

It has been found that the resultant solution is very stable and remains as a clear monomer solution for many hours when it is allowed to stand in a pressure vessel at 0° C. and that any known low molecular weight polymer is hardly formed.

Further, we have found that formaldehyde in such a uniform solution may readily polymerize a high molecular weight polymer by effecting an anionic or cationic catalyst on the solution.

It has been disclosed in N. S. Enikolopyan et al., Vysokomolek. Soed., Vol. 5, page 1653 (1963) or J. Polymer Sci., Vol. 58, page 1301 (1962) that an anionic catalyst is generally poisoned with carbon dioxide. However, each of these articles relates to the result obtained with an anionic catalyst of polymerization in an organic solvent maintained at a low temperature of about −20° C.

We have found that the anionic catalyst has a sufficiently satisfactory catalytic activity at a temperature of 0° C. or higher when a solvent system is employed containing carbon dioxide as a main component.

It may be considered that an anionic polymerization is advantageously achieved because the use of the solvent system containing carbon dioxide as a main component causes the change of the polarity of the polymerizing system and the acidity in the system is extremely reduced.

It has been also found that a cationic catalyst has likewise a very high catalytic activity even at a lower temperature in the polymerization of formaldehyde with the solvent system containing carbon dioxide as a main component and that a high molecular weight polymer may be also obtained by employing a cationic catalyst. Though the mechanism of this reaction has never yet been elucidated, it is assumed that extremely minor component such as alcohol, water and the like contained in monomeric formaldehyde may act as a base in the solvent system containing carbon dioxide as a main component and so an undesirable chain transfer reaction in cationic polymerization becomes difficult to occur. Then a high molecular weight polymer, which has been hitherto obtained only by employing a substantially anhydrous polymerizing system, may be readily obtained from a substantially unpurified formaldehyde monomer.

Further, the process of the present invention has a very important advantage in that the polymer may be readily isolated from carbon dioxide and any unrelated formaldehyde simply by reducing the pressure of the system to an atmospheric pressure after the completion of polymerization.

Another preferable advantage of the process of the present invention resides in that a polymerizing solution may be simply reprepared by adding a required quantity of formaldehyde vapor into a separated gas phase to adjust the monomer concentration and compressing and liquefying the mixture. Thus the solvent, carbon dioxide, and unreacted formaldehyde may be readily recovered and recycled. These advantages have never been obtained by any prior known process for preparing a high molecular weight polymer of formaldehyde, and it may be expected that these advantages have a very important meaning as a commercial process.

The formaldehyde employed in the practice of the present invention need not to be highly dehydrated and purified. The permissible moisture content thereof may be up to 5 percent by weight, and preferably up to 2 percent by weight. While it is generally the most preferable that the monomer is one obtained by the thermal decomposition of α-polyoxymethylene, and formaldehyde obtained from any of the other compounds such as paraform-aldehyde may be employed. In case of the use of α-polyoxymethylene, the water usually contained therein need not be removed. A desirable solution of formaldehyde in carbon dioxide may be directly and advantageously obtained by thermally decomposing α-polyoxymethylene as such in a stream of carbon dioxide and then cooling or compressing the stream leaving the thermal decomposition vessel to liquefy it.

The carbon dioxide employed in the present invention may be any commercially available product in a cylinder as such, and it is unnecessary to specially purify the product. Any solid carbon dioxide commercially available as Dry Ice may be also employed. While the concentration of a formaldehyde solution in carbon dioxide employed is usually 2 to 90 percent by weight, the concentration of 20 to 75 percent by weight is particularly preferred.

The catalysts, which may be employed in the practice of the present invention, are the following compounds.

Titanium tetrachloride, tin tetrachloride, ferric chloride, boron trifluoride and an etherate thereof; an organic acid such as formic acid and the like, various sulfates and phosphates, and a solid acid such as alumina and the like may be employed as a cationic catalyst.

Also, as an anionic catalyst, amines such as trimethylamine, tri-n-butylamine, octadecyldimethylamine, morpholine and the like; amino compounds such as pyridine, N,N-dimethyl-p-aminoazobenzene, hydrazine and the like; organic compounds of phosphorus, arsenic and antimony such as triphenylphosphine, triphenylarsine, triphenylstibine and the like; alkyl- or aryl- alkali metal compounds such as ethyllithium, n-butyllithium, ethylsodium, phenylpotassium and the like; alkali- or alkaline earth metal salts of an organic acid such as sodium formate, calcium stearate and the like; alkaline earth metal oxides such as calcium oxide, strontium oxide, barium oxide and the like; alkali- or alkaline earth metal carbonates such as sodium carbonate, potassium bicarbonate, strontium carbonate, calcium carbonate and barium carbonate; metal alkoxides such as calcium glycoxide, an aluminum alkoxide, iron ethoxide and the like; and strong alkalis such as caustic soda and the like may be employed.

Organic compounds of metals belonged to I to III Groups of the Mendeleev's Periodic Table, such as triethylaluminum, diethylzinc, an alkylmagnesium and the like may be also employed alone or together with another electron donative material. The problem that the catalyst residue remains in the resultant polymer in a prior polymerization method by catalysts may be simply solved by employing a volatile compound of these catalysts such as trimethylamine and the like, since the polymer may be isolated by evaporating the remaining catalyst together with carbon dioxide after the completion of reaction.

These catalysts are usually employed in the form of a solution or dispersion in carbondioxide, but they may be also employed by dissolving or dispersing in carbon dioxide a solution thereof in an organic solvent. These catalysts are employed in a quantity of 1 percent to 0.0001 percent, and preferably 0.1 percent to 0.01 percent, by weight based on the weight of the formaldehyde monomer.

An organic solvent, which is chemically inert to formaldehyde, other than carbon dioxide may be also added in the practice of the present invention. The organic solvents, which may be employed, include aliphatic ethers, aromatic ethers, alicyclic ethers, aliphatic carboxylic acid esters, aromatic hydrocarbons, aliphatic hydrocarbons, halogenated aliphatic hydrocarbons, nitriles, ketones, aldehydes and acetals. In consideration of the easiness in the separation of the polymer, a compound of low boiling temperature such as ethane, butane, propane, tert-pentane, dimethyl ether, diethyl ether and the like is particularly preferable, because these volatile compounds may be readliy separated from the polymer by evaporating them together with carbon dioxide and unreacted formaldehyde. One of these organic solvents may be employed alone, but the mixture of two or more may be also added.

While these organic solvents may be employed in a volume ratio of 1/100 to 100/1 to the mixed solution of formaldehyde and carbon dioxide, a particularly preferable quantity added is 1/50 to 1/2.

The temperature, at which formaldehyde may polymerize according to the process of the present invention, is within the range of —100° to 50° C. However, for a cationic catalyst a low temperature up to 0° C. is preferred, and for an anionic catalyst it is preferred to carry out the polymerization within the temperature range of —20° to 50° C. If the polymerization temperature employed is higher than the boiling points of formaldehyde and carbon dioxide, the polymerization system will be under pressure. The pressure may vary within the range of several atmospheres to 100 atmospheres depending upon the ratio of formaldehyde to carbon dioxide employed, the quantity of the charge and the reaction temperature.

The following examples illustrate the embodiments of the present invention, but they should not be construed to limit the invention. The process of the present invention may be carried out either in a batch system or in a flow system.

Examples 1 to 5

α-Polyoxymethylene, which had been previously dried, was placed in a flask. After the inside of the flask was displaced with carbon dioxide (a commercial product in a cylinder was employed), α-polyoxymethylene was heated to thermally decompose into formaldehyde vapor. The formaldehyde was transferred into a glass container, which had been previously cooled at —78° C., with carbon dioxide introduced into the flask through another inlet.

The liquid thus collected was a solution of formaldehyde in carbon dioxide. The concentration of formaldehyde may vary within the range of 62 percent to 60 percent by weight, depending to some extent upon the production rate of formaldehyde and the flow rate of carbon dioxide.

In these examples the concentration of formaldehyde was 60.5 percent by weight. Into an autoclave having a capacity of 100 ml. and equipped with an agitator a given quantity, which will be shown below, of the catalyst solution, which had been previously prepared, was charged while avoiding to contact with air, and then cooled to —78° C. The autoclave was evacuated, and 33.0 grams of said mixed solution of formaldehyde and carbon dioxide was charged. The autoclave was dipped in an ice bath at 0° C. with stirring for 1.5 hours. After the completion of the polymerization, the whole was again cooled to —78° C., and unreacted formaldehyde and carbon dioxide were released, and the resultant polymer was removed out.

The polymer was washed with cold ether, and dried in vacuo and weighed. The results of the experiments are shown in the table below.

The quantities of the catalysts employed were respectively 0.270 ml. of a 10 percent by weight toluene solution for triethylaluminum, 2 ml. of a 0.01 mole/100 ml. toluene solution for tri-n-butylamine, 60.7 mg. for calcium stearate and 26.2 mg. for triphenylphosphine.

| | Catalyst | | Experimental results | |
|---|---|---|---|---|
| Ex. | Compound | Amount added ($\times 10^4$ mol) | Polymer (g.) | Inherent viscosity, $\eta 60°$ |
| 1 | None | | 0.46 | 1.1 |
| 2 | Triethylaluminium | 1 | 13.8 | 0.43 |
| 3 | Tri-n-butylamine | 2 | 18.4 | 0.52 |
| 4 | Triphenylphosphine | 1 | 9.8 | 0.93 |
| 5 | Calcium stearate | 1 | 16.6 | 1.4 |

In the above table the inherent viscosity $\eta 60°$ is a value obtained by measuring on a solution of 0.5 grams of the polymer dissolved in 100 ml. of p-chlorophenol containing 2 percent of α-pinene at 60° C.

Example 6

1 ml. of dimethyl ether solution containing 0.59 gram of trimethylamine in 100 ml. was charged into a 100 ml. autoclave, which had been previously cooled to −78° C., while avoiding to contact with air. 33.0 grams of a solution of formaldehyde and carbon dioxide (the concentration of formaldehyde: 61.8 percent by weight) which had been prepared in the same manner as in Examples 1 to 5, and 28 grams of carbon dioxide were then charged. After the autoclave was kept in an ice bath at 0° C. for two hours, the pressure in the autoclave was reduced to release unreacted formaldehyde, carbon dioxide and the volatile catalyst. The resultant polymer was dried as such in vacuo and weighed. The yield of the product was 16.8 grams and the inherent viscosity $\eta 60°$ of the product was 0.67.

Example 7

16.5 grams of a solution of formaldehyde and carbon dioxide (the concentration of formaldehyde: 60.2 percent by weight), which had been prepared in the same manner as in Examples 1 to 5, was separately charged into 2 flasks, which had been displaced with dry nitrogen and cooled to −78° C. To said solution 2.5 ml. of a toluene solution of tin tetrachloride and 2.5 ml. of an ether solution of boron trifluoride, which had been previously prepared at a concentration of $1 \times 10^{-2}$ mol/100 ml., were respectively added with a syringe while avoiding to contact with air. After the addition, the mixture was stirred for 2 hours while cooling at −78° C.

After the completion of the reaction, a large quantity of cold ether was added and the resultant polymer was filtered, washed, dried in vacuo and weighed. The yield of the polymer obtained by employing tin tetrachloride as a catalyst was 4.87 grams and the inherent viscosity $\eta 60°$ of the product was 0.52; while the yield of the product obtained by employing boron trifluoride as a catalyst was 1.93 grams and the inherent viscosity $\eta 60°$ of the product was 0.71.

What we claim is:

1. A process for preparing a high molecular weight polymer of formaldehyde which comprises polymerizing formaldehyde having a moisture content of up to 5 percent by weight in the presence of an ionic catalyst in an amount of 0.0001 percent of 1 percent by weight based on the weight of the formaldehyde monomer in liquid carbon dioxide at a temperature within the range of −20° C. to +50° C., the concentration of the formaldehyde in the liquid carbon dioxide being 20 to 75 percent by weight.

2. A process according to claim 1, for preparing a high molecular weight wherein the ionic catalyst is selected from the group consisting of triethylaluminum, tri-n-butylamine, triphenylphosphine, calcium stearate, trimethylamine, tin tetra-chloride and boron trifluoride.

3. A process according to claim 1, wherein the temperature is about 0° C., the concentration of the formaldehyde in the liquid carbon dioxide is about 60.5 percent by weight, and the ionic catalyst is selected from the group consisting of triethylaluminum, tri-n-butyl-amine, triphenylphosphine and calcium stearate.

4. A process according to claim 1, wherein the concentration of the formaldehyde is 60.2 percent by weight and the ionic catalyst is tin tetrachloride or boron trifluoride.

5. A process according to claim 1, wherein the temperature is about 0° C. and the ionic catalyst is trimethylamine.

References Cited

UNITED STATES PATENTS 3,257,359 6/1966 Bezzi _____ 260—67
3,297,644 1/1967 Wagner et al. _____ 260—67
3,017,389 1/1962 Langsdorf et al.
3,309,296 3/1967 Fukui et al.

WILLIAM H. SHORT, Primary Examiner.

L. M. PHYNES, Assistant Examiner.

PO-1050
(5/69)

UNITED STATES PATENT OFFICE
CERTIFICATE OF CORRECTION

Patent No. 3,446,776      Dated May 27, 1969

Inventor(s) Kenichi FUKUI et al

It is certified that error appears in the above-identified patent and that said Letters Patent are hereby corrected as shown below:

Claim 1, line 5, change "0.0001 percent of 1 percent" to -- 0.0001 percent to 1 percent --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents